(12) United States Patent
Magoshi et al.

(10) Patent No.: US 6,961,464 B2
(45) Date of Patent: Nov. 1, 2005

(54) METHOD FOR CREATING A DATABASE SUCH AS A DICTIONARY USED FOR A WORD CONVERSION SYSTEM

(75) Inventors: Hidetaka Magoshi, Foster City, CA (US); Nobuo Sasaki, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 765 days.

(21) Appl. No.: 10/039,546

(22) Filed: Oct. 22, 2001

(65) Prior Publication Data

US 2002/0118876 A1 Aug. 29, 2002

(30) Foreign Application Priority Data

Dec. 1, 2000 (JP) ........................... 2000-366729
Aug. 14, 2001 (JP) ........................... 2001-245895

(51) Int. Cl.[7] .............................................. G06K 9/34
(52) U.S. Cl. ................... 382/177; 382/181; 382/305; 707/102
(58) Field of Search .............................. 382/177, 181, 382/305; 704/10; 707/102; 715/532

(56) References Cited

U.S. PATENT DOCUMENTS

| 5,295,068 A | * | 3/1994 | Nishino et al. ............... 704/10 |
| 5,497,319 A | * | 3/1996 | Chong et al. ................ 704/10 |
| 5,799,268 A | * | 8/1998 | Boguraev .................... 704/10 |

FOREIGN PATENT DOCUMENTS

| JP | 10-269224 A | 10/1998 |
| JP | 11-096177 A | 4/1999 |
| JP | 2000148748 | 5/2000 |
| JP | 2000227923 | 8/2000 |

* cited by examiner

*Primary Examiner*—Phuoc Tran
(74) *Attorney, Agent, or Firm*—Lerner, David, Littenberg, Krumholz & Mentlik, LLP

(57) ABSTRACT

Character (or letter) information is extracted from source information, word information is extracted from the character information, and a database is created of the word information. Thereby, the created database is adapted for the technical field of the user or a field of interest to the user.

18 Claims, 3 Drawing Sheets

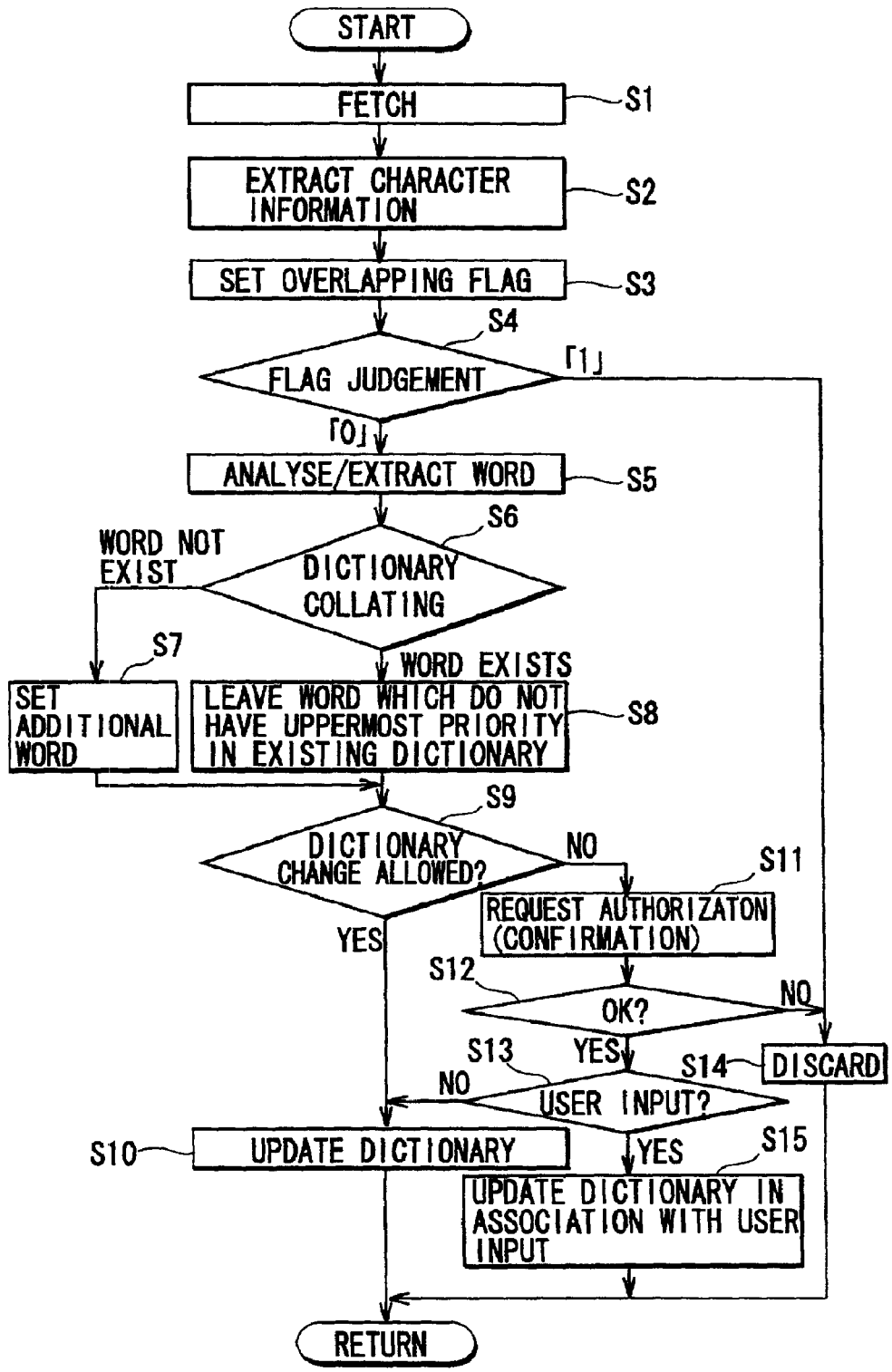

METHOD FOR CREATING A DATABASE SUCH AS A DICTIONARY USED FOR A WORD CONVERSION SYSTEM

CROSS-REFERENCE TO RELATED APPLICATIONS

This application claims priority from Japanese Patent Application Nos. 2000-366729 filed on Dec. 1, 2000, and 2001-245895 filed on Aug. 14, 2001, the disclosures of which are hereby incorporated by reference herein.

BACKGROUND OF THE INVENTION

The present invention relates to a database creation method and apparatus suitable for creating a database such as, for example, a dictionary used for a Kana-Kanji conversion system or a Roman character-Kanji conversion system, a database creation program to be executed by a computer, and a computer-readable recording medium on which a database creation program to be executed by a computer has been recorded.

Conventionally in a Kana-Kanji conversion or Roman character-Kanji conversion system (hereinafter referred to as a Kanji conversion system) employing, for example, a personal computer or a document composition apparatus (a so-called word processor), input signals from a keyboard and the like, for example, are transformed to Kana or Roman character codes, and character images of Kana characters or Roman characters corresponding to these codes are displayed on a screen of a display device, or one or a plurality of contiguous Kana codes or Roman character sequences are transformed to kanji codes and kanji-character images corresponding to these Kanji codes are displayed. Incidentally, the term "Kana-Kanji conversion" means transforming Kana codes to kanji codes, and the term "Roman character-Kanji conversion" means transforming Roman character codes to Kanji codes.

Moreover, the above Kanji conversion system is generally provided with a dictionary database where a correspondence table between Kana characters and words has been stored, and it is configured so as to perform a conversion from one or a plurality of contiguous Kana characters to a word automatically or according to an instruction from a user. Incidentally, the above "word" is constituted by a combination of a plurality of kanji characters, a combination of Kanji character(s) and Kana character(s), a plurality of Katakana characters, or the like.

An original dictionary database which is prepared for the Kanji conversion system in advance is one which has been prepared and created by, for example, a kana-Kanji or Roman character-Kanji conversion software vendor or the like. Moreover, many of such dictionary databases are configured to allow the addition of new words and the update of words, or an automatic setting of conversion priority according to the use frequencies of words.

However, in order to add a new word to the dictionary database intentionally, such a user's work or operation is required that, for example, a user retrieves his or her desired kanji characters or kana characters from the dictionary database to create a word by combining these characters and then issues an instruction for adding and registering the created word to the dictionary database or an instruction for performing updating on the dictionary database.

Moreover, in order to change the conversion priority intentionally, a user must perform such a work or operation as input operation for transforming the Kana characters to a word, for example, a plurality of times.

As mentioned above, in the conventional Kanji conversion system, several complicated operations or steps conducted by a user manually are required to perform the addition of a new word and the update of an existing word or the intentional setting of a conversion priority, which results in a remarkable deterioration of efficiency.

SUMMARY OF THE INVENTION

The present invention has been made in view of such a problem, and an object thereof is to provide a database creation method and a database creation apparatus where addition of a new word to a dictionary database of, for example, a Kanji conversion system and update of the dictionary database or setting of a conversion priority can easily be performed in a simplified manner without any complicated operation or work performed by a user. Also provided is a database creation processing program to be executed by a computer and a computer-readable recording medium on which a database creation processing program to be executed by a computer has been recorded.

In the present invention, character information is extracted from source information, word information is extracted from the character information, and a database is created of word information.

In the present invention, character information is extracted from at least one of a page retrieved on a predetermined network and a page browsed thereon, or source information such as electronic mail information, or an image signal, word information is extracted from the character information, and a database is created of the word information, so that addition of a new word to a dictionary database and update of the dictionary database or setting of a conversion priority can be realized without any complicated operation conducted by a user.

Other and further objects and features of the present invention will become obvious upon understanding of the illustrative embodiments about to be described in connection with the accompanying drawings or will be indicated in the appended claims, and various advantages not referred to herein will occur to one skilled in the art upon employing of the invention in practice.

BRIEF DESCRIPTION OF THE DRAWINGS

FIG. 4 is a flowchart showing a process flow in the dictionary database creation program of the present invention.

DETAILED DESCRIPTION

Figure 1:
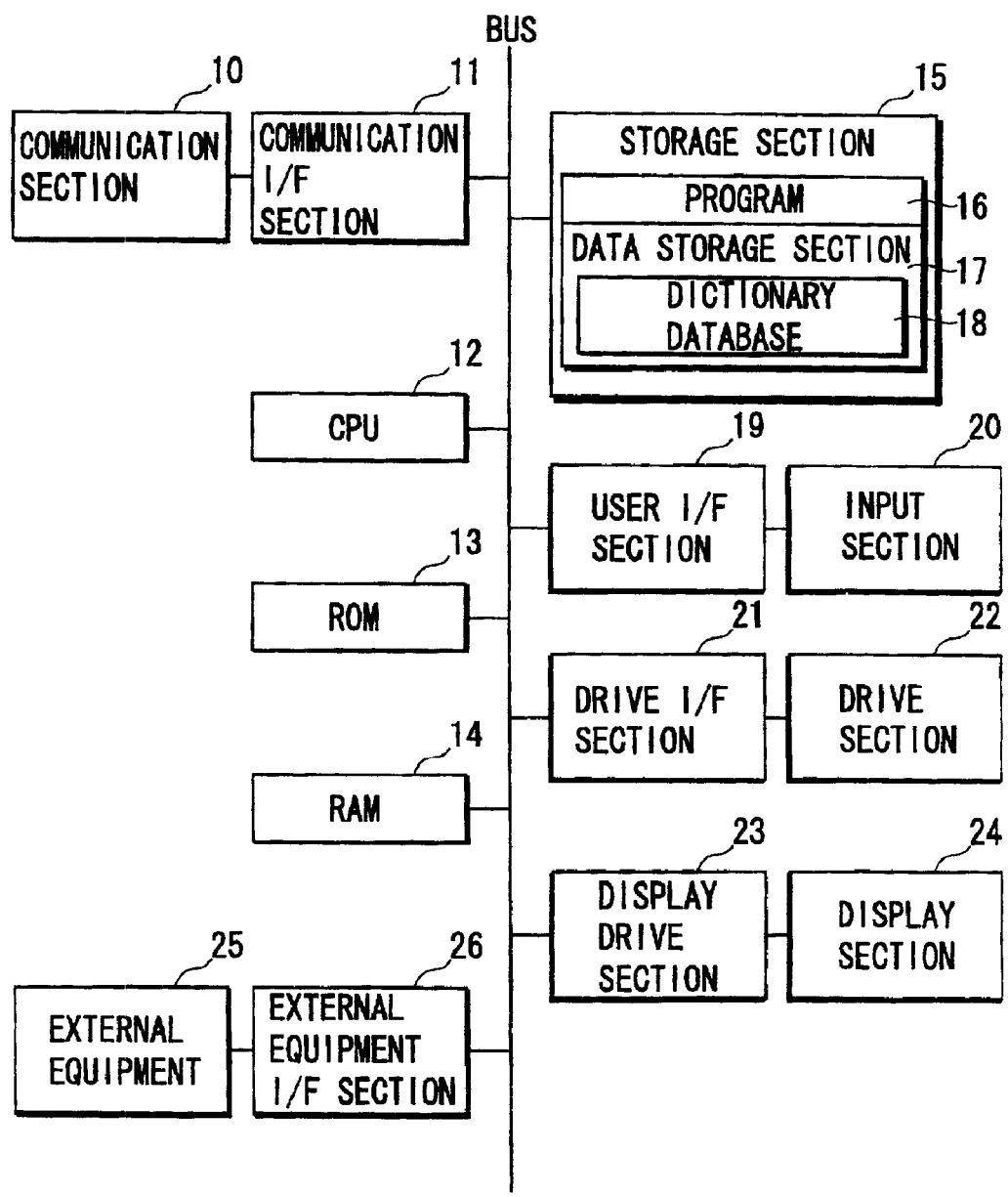
FIG. 1 is a block circuit diagram showing a configuration of a main portion of a personal computer executing a dictionary database creation program in accordance with the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Overview of Embodiment of the Invention

A dictionary database creation apparatus of the present invention is an apparatus for creating a dictionary database used in, for example, a Kana-Kanji and Roman character-Kanji conversion system, where character (or letter) information is extracted from, for example, source information retrieved from the outside, a word is extracted from the character information, and update of the dictionary database and addition and registration of a word to the dictionary database and the like are performed using the extracted word, so that a composition of a dictionary database easy to use can be made easy and simple.

Here, it is considered that many words regarding a field interesting for a user or regarding a user's technical field are included in character information obtained by retrieving from or browsing on the Internet, or by electronic mail communications conducted by a user. Character information also may be obtained utilizing such an approach as character recognition or the like, from image signals such as television signals or video signals, or from image signals retrieved by scanning books or magazines. In addition, character information may be obtained from various types of recording media such as CD-ROMS or DVD-ROMS. Moreover, it is considered that, when preparing or producing, for example, a document using a Kana-Kanji and Roman character-Kanji conversion system, a user is likely to use a word or words regarding his or her field of interest or technical field, often (the frequency of using the word(s) is high).

From the above, in the dictionary database creation apparatus of the present invention, a word(s) is extracted from the character (or letter) information obtained from the Internet retrieving, browsing or electronic mail, the character information obtained from television signals or the like or image signals scanned, or the character information obtained from the CD-ROM or the like, the extracted word(s) is added and registered to an original database which has been prepared, for example, in a Kana-Kanji and Roman character-Kanji conversion system, and the database is updated according to the extracted word(s), and such a processing as an advance of a conversion priority is performed on the extracted word(s).

That is, according to the present invention, the extracted word(s) is added and registered to the dictionary database or the dictionary database is updated and setting of a conversion priority is performed on the extracted word(s) so that a dictionary database easy to use can be created easily and simply without any complicated operations to be conducted by a user manually. Moreover, the present invention is useful, particularly when a dictionary database including foreign languages expressed by Katakana characters is created. Incidentally, the dictionary database creation apparatus of the present invention is applicable to not only a case where a word(s) is added and registered to an existing database and the database is updated, but also a case where a dictionary database is newly created.

Schematic Block Configuration of the Present Invention

FIG. 1 shows a schematic block configuration of an apparatus for performing a processing program for dictionary database creation (hereinafter, referred to as a dictionary database creation program). Incidentally, FIG. 1 shows a configuration of only a main portion applied when the dictionary database creation program of the present invention is executed by, for example, a personal computer.

In FIG. 1, a storage section 15 comprises, for example, a hard disk and a drive therefor. Besides an operating system program, stored in the hard disk are various programs 16, including a dictionary database creation program (described later) for implementing the dictionary database creation process of the present invention, or, for example, a Kana-Kanji and Roman character-Kanji conversion program for realizing a Kana-Kanji and Roman character-Kanji conversion system, a browser program for connecting to and browsing on the Internet, a mail program for preparing, transmitting and receiving electronic mail, a capture program for capturing various image signals such as video signals and television signals, a character recognition program for performing character recognition from image data read by a flat head scanner or the like, for example, image signals captured in the above manner, or the like to perform conversion to character data, a program for retrieving data from various recording media such as a CD-ROM or DVD-ROM, and other various pieces of data 17. Incidentally, the dictionary database creation program of the present invention may be included in another program such as the Kana-Kanji and Roman character-Kanji conversion program or the like.

An original of the dictionary database 18 (initial dictionary database) is one which has been provided by a vendor which has prepared, for example, Kana-Kanji and Roman character-Kanji conversion software, or the like, and which allows the addition of a new word(s) and updates and/or the automatic setting of a conversion priority according to the frequency with which a word is used. Incidentally, the dictionary database 18 may be one which has been retrieved from another Kana-Kanji and Roman character-Kanji conversion software other than one provided by the vendor which has prepared the Kana-Kanji and Roman character-Kanji conversion software, and it may be one which has been provided together with the dictionary database creation program of the present invention, or one which has been provided separately.

A communication section 10 is a communication device for performing data communication externally, such as a modem for connection to analog public telephone lines, a cable modem for connection to a cable television network, a terminal adapter (Terminal Adapter: TA) for connection to an ISDN (Integrated Services Digital Network), or the like. A communication I/F section 11 is an interface device for performing a protocol conversion for allowing transmission/reception of data between the above communication section 10 and an internal bus (BUS). In the present embodiment, connection, retrieving and browsing on the Internet, and transmission/reception of electronic mail are allowed by the above communication section 10 and the communication I/F section 11.

External equipment 25 is equipment such as a flat head scanner, a TV tuner, a video tape recorder, a video disk player, a digital camera, a video camera, a BS tuner for receiving satellite broadcasts, a CS tuner for connection to a communication satellite lines or the like. An external equipment I/F section 26 is an interface device for retrieving signals provided from the external equipment 25 into the apparatus.

An input section 20 is an input device such as a keyboard, a mouse, and a touch pad. A user I/F section 19 is an interface device for supplying signals from the input section 20 to the apparatus.

A drive section 22 is a drive device or unit which can read at least data from, for example, a CD-ROM or a DVD-ROM, a disk medium such as a floppy disk, and a semiconductor memory such as a card, or the like. A drive I/F section 21 is an interface device for providing signals from the drive section 22 to the apparatus.

A display section 24 is a display device such as a CRT (cathode ray tube) or a liquid crystal panel. A display drive section 23 is a drive device for displaying and driving the display section 24.

A CPU 12 controls all operations of a personal computer shown in FIG. 1 on the basis of the operating system program stored in the storage section 15 and the above programs 16.

A ROM 13 comprises a rewritable non-volatile memory such as a flash memory and it stores the BIOS (Basic Input/Output System) of the personal computer shown in FIG. 1 and various initially set values. A RAM 14 is loaded with application programs or the like read from the hard disk of the storage section 15, and it is used as a work RAM of the CPU 12.

In the configuration shown in FIG. 1, the CPU 12 performs such processes as creating a dictionary database, adding and registering a new word(s) to the dictionary database and updating the dictionary database, setting of a conversion priority and the like by executing the dictionary database creation program described below, which is one of the application programs which have been read from the hard disk of the storage section 15 and loaded in the RAM 14.

Schematic Configuration of the Dictionary Database Creation Program of the Present Invention
Basic Configuration of the Dictionary Database Creation Program Next, he configuration of an application program (dictionary database creation program) applied to the CPU 12 of the present invention to execute a dictionary database creation process will be explained.

Figure 2:
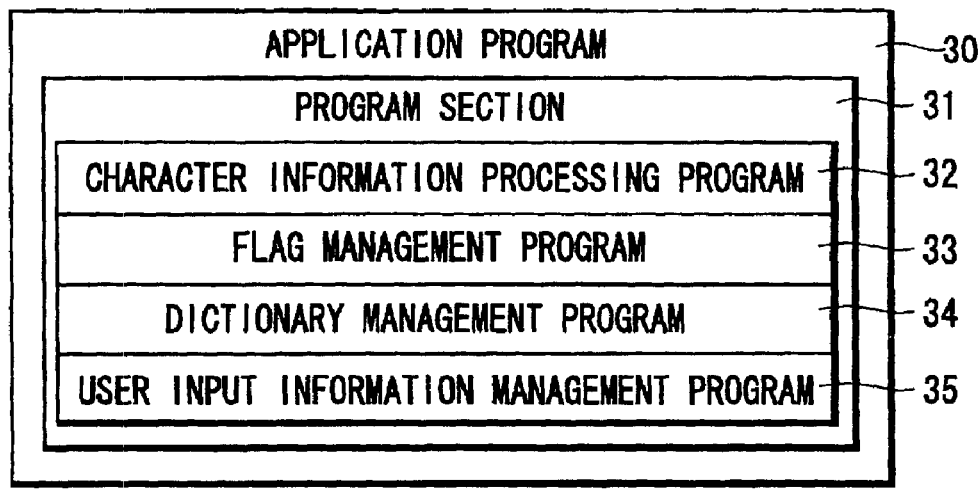
FIG. 2 is a diagram conceptually representing a basic configuration of the dictionary database creation program of the present invention.

The dictionary database creation program may be a program which can be recorded on a recording medium such as an optical disk (such as a DVD-ROM or a CD-ROM), a semiconductor memory or the like, or one which can be downloaded through a communication line, and the program has a data configuration such as shown in FIG. 2, for example. Incidentally, the data configuration shown in FIG. 2 conceptually represents a basic configuration of the dictionary database creation program of this invention, and it does not represent an actual program configuration.

As shown in FIG. 2, a dictionary database creation program 30 of the present invention is provided, as a program section 31 including programs which the CPU 12 of FIG. 1 executes, with at least a character information processing program 32, a flag management program 33, a dictionary management program 34 and a user input information management program 35.

The character information processing program 32 is a program which extracts character information from pages obtained in Internet retrieving or browsing or electronic mail, or extracts character information included in television signals or the like, image signals obtained from scanning or the like through a character recognizing approach, or extracts character information included in data obtained from CD-ROMs or the like, and then extracts a word(s) from this character information.

The flag management program 33 is a program for performing flag management such that, for example, character information is prevented from being extracted in a repetitive manner by sequentially adding individual flags to respective character information pieces extracted in the above manner, or a frequency of appearance is obtained by measuring the number of extraction times of the same character information. Incidentally, the repetitive extraction of the same character information is prevented by using the flags.

The dictionary management program 34 is a program for performing such dictionary management as addition and registration of a word(s) to the dictionary database, update of the dictionary database, setting of a conversion priority according to the frequency in use of a word(s) or the like.

The user input information management program 35 is a program for managing a user's input information when a user provides an instruction about whether addition and registration of a word(s) to the dictionary database or update of the dictionary database should be performed or an instruction for an automatic setting or a manual setting of a conversion priority, or for managing a user's input information such as, for example, where reading of a word is input by a user, the information about the reading is caused to correspond to the word.

Figure 3:
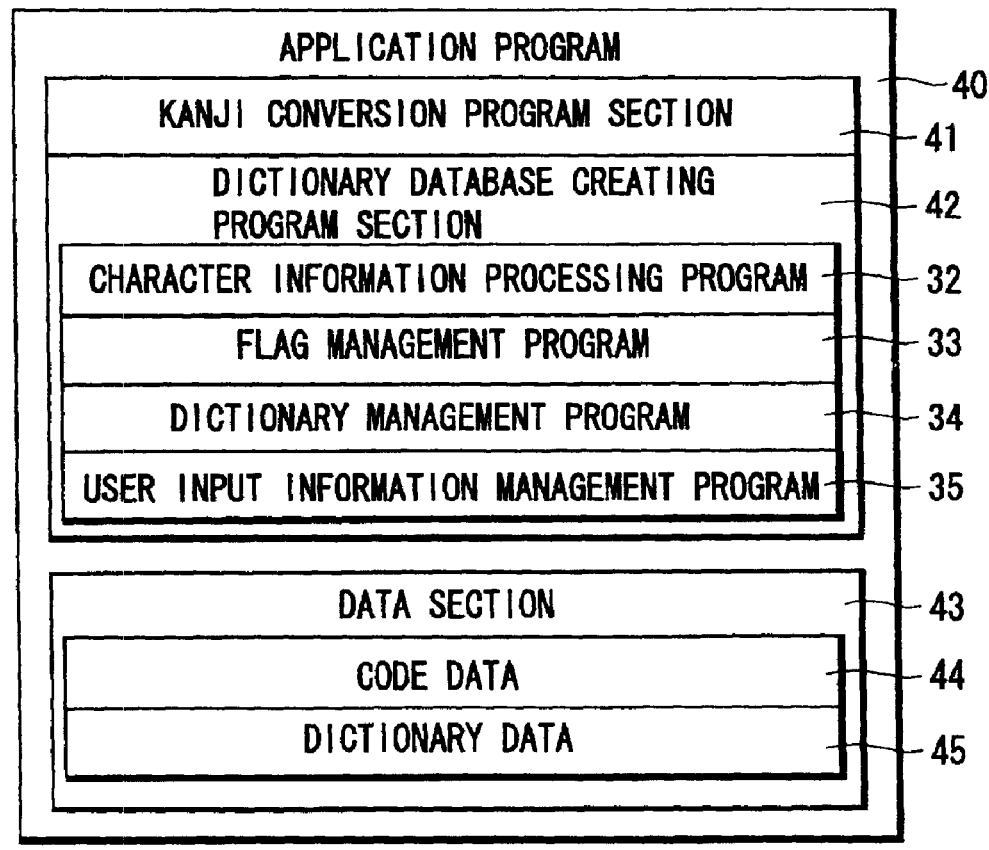
FIG. 3 is a diagram conceptually representing a configuration of a Kana-Kanji and Roman character-Kanji conversion application program including the dictionary database creation program of the present invention.

Application Example to a Kana-Kanji and Roman Character-Kanji Conversion Program An example in FIG. 2 shows a basic configuration of a dictionary database creation program unit. However, when the dictionary database creation program of the invention is included in, for example, a Kana-Kanji and Roman character-Kanji conversion program, a data configuration, for example, such as shown in FIG. 3, is considered. Incidentally, the data configuration shown in FIG. 3 conceptually shows an application program like the example shown in FIG. 2, but it does not show an actual program configuration.

The Kana-Kanji and Roman character-Kanji conversion application program 40 shown in FIG. 3 has a Kanji conversion program section 41, a dictionary database creation program section 42 like the program section 31 shown in FIG. 2, and a data section 43 used for Kana-Kanji and Roman character-Kanji conversion. Incidentally, since the dictionary database creation program 42 is similar to the program section 31 shown in FIG. 2, explanation thereof will be omitted. Moreover, the Kanji conversion program section 41 is substantially similar to document preparation software commonly referred to as a word processor.

The data section 43 comprises code data 44 including Kana codes, Roman character codes, Kanji codes, and the other codes which are used for Kana-kanji and Roman character-Kanji conversion, and dictionary data 45 for a dictionary database which represents a correspondence table between Kana characters and words.

Here, the dictionary data 45 provided from, for example, a CD-ROM, DVD-ROM or the like, namely, the dictionary data 45 just after the Kanji-kana and Roman character-Kanji conversion application program 40 has installed in the personal computer, is prepared as an original initial dictionary database in advance.

Processing Flow at the Time of Execution of the Dictionary Database Creation Program of the Invention Hereinafter, the processing flow in the dictionary database creation program 30 or 42 of the embodiments shown in FIGS. 2 and 3 will be explained with reference to the flowchart shown in FIG. 4. Incidentally, the flow explained below is implemented by the fact that respective programs constituting the dictionary database creation program operate on the CPU 12.

In the dictionary database creation program of the embodiment shown in FIG. 4, in the process of step S1, first, the document information processing program 32 retrieves or fetches information such as the Internet retrieved or browsed pages, electronic mail, television signals and scanned image signals, data files stored in various storage devices (or recording media built in or loaded therein) such as a hard disk drive or a CD-ROM or DVD-ROM drive, or a semiconductor memory device as source information, and character information is then extracted from the retrieved information in the process of step S2. For example, when the character information is extracted from the Internet retrieved or browsed pages, the character information is extracted from a text region of an HTML (Hyper Text Markup Language) file. For example, when the character information is extracted from the image signals, the character information is extracted by, for example, a character recognition process or the like. Moreover, the data file stored in the above storage device or the recording medium may be designated implicitly by a user or it may not (namely, may be retrieved arbitrarily).

Next, as step S3, the flag management program 33 adds flags to respective extracted character information pieces. Next, in step S4, the flag management program 33 determines whether "1" is set to the flag regarding respective character information pieces, and the character information pieces where "1" is set to the flag is discarded as step S14. Incidentally, in this embodiment, the reason why the duplicate character information piece is discarded in this manner is to reduce the processing of step S5 and subsequent steps.

On the other hand, regarding the character information pieces string where the flag is not set to "1" (the flag is "0"), the character information processing program 32 breaks up the character information piece string to respective words to extract them as step S5.

Next, as step S6, the dictionary management program 34 performs collating about whether the extracted word exists in the existing dictionary database. In step S6, when it is determined that the word does not exist in the existing dictionary database, the dictionary management program 34 sets the extracted word to a word to be added and registered to the dictionary database as step S7. On the other hand, in a case of a word present in the existing dictionary database, the dictionary management program 34 updates the existing dictionary database with the word while leaving only the word which does not have the conversion uppermost priority as step S8. Incidentally, the reason why only the word which does not have the conversion uppermost priority is left in this manner is for preventing the word which has already applied with the conversion uppermost priority on the basis of use of a user from being changed by the extracted word.

Then, as step S9, the dictionary management program 34 judges whether or not a user has authorized a change of the dictionary database collectively on the basis of the user input information managed by the user input information management program 35. Here, when the judgment is affirmative, the process of the dictionary database creation program advances to step S10, but when the judgment is negative, the process of the dictionary database creation program advances to step S11.

In step S10, the dictionary management program 34 updates the dictionary database using the above word. On the other hand, when the process of the dictionary database creation program advances to step S11, the user input information management program 35 performs processing such that a confirmation message for requesting update authorization is displayed on the above display section 24, and then whether or not update authorization has been given by the user is judged as step S12. In step S12, when the update authorization has been given by the user, the process of the dictionary database creation program advances to step S13, but when the update authorization has not been given, the process of the dictionary database creation program discards the word in step S14.

When the process advances to step S13, the user input information management program 35 judges whether or not an input such as, for example, "reading" of the word has been made by the user. In step S13, when the user input has not been performed, the process of the dictionary database creation program advances to step S10, but when the user input has been performed, the process of the dictionary database creation program advances to step S15.

When the process advances to step S10 from step 13, the dictionary management program 34 updates the dictionary database using the word.

Moreover, when the process advances to step S15, the dictionary management program 34 associates input data such as "reading" or the like delivered from the user input information management program 35 and the word with each other to perform update of the dictionary database.

Conclusion of Embodiments

As mentioned above, according to the invention, the dictionary database including words regarding a field of interest to a user or regarding a user's technical field can be created simply and easily. Moreover, for example, when the present invention is applied to a Roman character-Kanji conversion system, a system which is very easy to use can be realized.

Furthermore, in the present invention, respective characters extracted from source information are sequentially and individually set with flags, and judgment is made according to the set flags about whether or not extraction of character information from the source information is required. Moreover, the extracted word information is collated with the word information in the existing database. When the extracted word information does not exist in the existing database, the extracted word information is added and registered in the existing database. In case the extracted word information exists in the existing database, the existing database is updated only when the extracted word information is not the same as the word information having the uppermost priority in the existing database.

That is, according to the present invention, the source information is at least one of the page for which a user is retrieving on a predetermined communication network and the page which the user is browsing thereon, or electronic mail information for which the user performs transmission/reception, and character information and word information are extracted from the source information so that the database is created with the extracted word information and character information. Therefore, the created database is adapted for the technical field of the user and the field interesting for the user. Moreover, since the database creation is made automatically or semi-automatically, it is unnecessary for the user to conduct such a work as addition or registration of a word(s) manually in order to create the database.

Incidentally, an embodiment where the present invention has been applied to, for example, a personal computer has been explained, but the present invention is applicable to a portable information terminal or PDA such as, for example, a portable telephone provided with a document preparation function, a document preparation device (a so-called word processor) provided with a communication or information input function, a home-use game device provided with a communication or information input function and a document preparation function, or the like. Moreover, in the above explanation, the embodiment where the present invention has been mainly applied to the Kana-Kanji and Roman character-Kanji conversion system has been employed. However, the present invention is, of course, applicable to not only a Kanji conversion system itself but also a system which only creates a dictionary database.

Furthermore, in the above embodiment, the example of the Japanese Kana-Kanji conversion and Roman character-Kanji conversion for transforming Roman characters to Kanji has been explained. However, the present invention can be applied to other language systems, for example, a Chinese Roman character-Kanji conversion system, a Roman character-Hangul alphabet conversion system, a Roman character-Arabic character conversion system, and the like. Moreover, the present invention is applicable to creating a word dictionary database for English, French, German or the like or creating a dictionary database to check spelling in the above languages. Particularly, when the present invention has been applied to a dictionary database to check spelling, it can be used for updating the change priority at a time of conversion to a right spell candidate in the dictionary database to check spelling.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A database creation method, comprising:
   extracting character information from source information;
   sequentially and individually setting flags to respective pieces of the character information extracted from the source information;
   extracting word information from the character information; and
   creating a database based on the word information.

2. The database creation method according to claim 1, further comprising:
   judging whether the character information has been extracted from the source information according to a previously set flag.

3. A database creation method, comprising:
   extracting character information from source information;
   extracting word information from the character information;
   collating the extracted word information with word information in an existing database; and
   adding and registering the extracted word information to the existing database when the extracted word information does not exist in the existing database.

4. The database creation method according to claim 3, further comprising:
   judging whether the extracted word information is identical to the word information having an uppermost priority when the extracted word information exists in the existing database; and
   updating the existing database according to the extracted word information when the extracted word information is not identical to the word information having the uppermost priority.

5. The database creation method according to claim 3, further comprising:
   judging whether a change in the existing database is allowed; and
   changing the existing database only when the change in the existing database is allowed.

6. The database creation method according to claim 5, further comprising:

making a judgment about the presence/absence of the setting of a change confirmation when the existing database is changed; and
generating a predetermined confirmation message when the change confirmation has been set.

7. A database creation apparatus, comprising:
   a character information extracting section which extracts character information from source information;
   a flag setting section which sequentially and individually sets flags to respective pieces of the character information extracted from the source information;
   a word information extracting section which extracts word information from the character information; and
   a creation section which creates a database from the word information.

8. The database creation apparatus according to claim 7, further comprising:
   a judging section which judges whether the character information has been extracted from the source information according to a previously set flag.

9. A database creation apparatus, comprising:
   a character information extracting section which extracts character information from source information;
   a word information extracting section which extracts word information from the character information; and
   a creation section which creates a database from the word information and which collates the extracted word information with the word information in an existing database, and when the extracted word information does not exist in the existing database, the extracted word information is added and registered into the existing database.

10. The database creation apparatus according to claim 9, wherein when the extracted word information exists in the existing database, the creation section further judges whether the extracted word information is identical to the word information having an uppermost priority which has been set in the existing database, and when the extracted word information is not identical to the word information having the uppermost priority, the existing database is updated on the basis of the extracted word information.

11. The database creation apparatus according to claim 9, wherein the creation section judges whether a change in the existing database is allowed, and the existing database is changed only when a change of the existing database is allowed.

12. The database creation apparatus according to claim 11, further comprising:
   a change confirming section which, when the existing database is changed, makes a judgment about whether a change confirmation has been set, and which, when the change confirmation has been set, generates a predetermined confirmation message.

13. A computer-readable recording medium recorded with a database creation program to be executed by a computer, the database creation program comprising:
   extracting character information from source information;
   sequentially and individually setting flags to respective pieces of the character information extracted from the source information;
   extracting word information from the character information; and
   creating a database from the word information.

14. The computer-readable recording medium according to claim 13, wherein the database creation program further comprises:

judging whether the character information has been extracted from the source information according to a previously set flag.

15. A computer-readable recording medium recorded with a database creation program to be executed by a computer, the database creation program comprising:

extracting character information from source information;

extracting word information from the character information;

creating a database from the word information;

collating the extracted word information with word information in an existing database; and adding and registering the extracted word information to the existing database when the extracted word information does not exist in the existing database.

16. The computer-readable recording medium according to claim 15, wherein the step of creating the database further comprises:

judging whether the extracted word information is identical to the word information having an uppermost priority when the extracted word information exists in the existing database; and updating the existing database according to the extracted word information when the extracted word information is not identical to the word information having the uppermost priority.

17. The computer-readable recording medium according to claim 15, wherein the step of creating the database further comprises:

judging whether a change in the existing database is allowed; and changing the existing database only when the change in the existing database is allowed.

18. The computer-readable recording medium according to claim 17, wherein the database creation program further comprises:

making a judgment about whether a change confirmation has been set when the existing database is changed; and generating a predetermined confirmation message when the change confirmation has been set.

* * * * *